July 8, 1930. J. T. FAIRHURST Re. 17,721

WARDROBE

Original Filed April 27, 1927 4 Sheets-Sheet 1

INVENTOR
John T. Fairhurst
BY
Bennett & Son
ATTORNEYS

J. T. FAIRHURST
July 8, 1930. WARDROBE Re. 17,721
Original Filed April 27, 1927 4 Sheets-Sheet 2
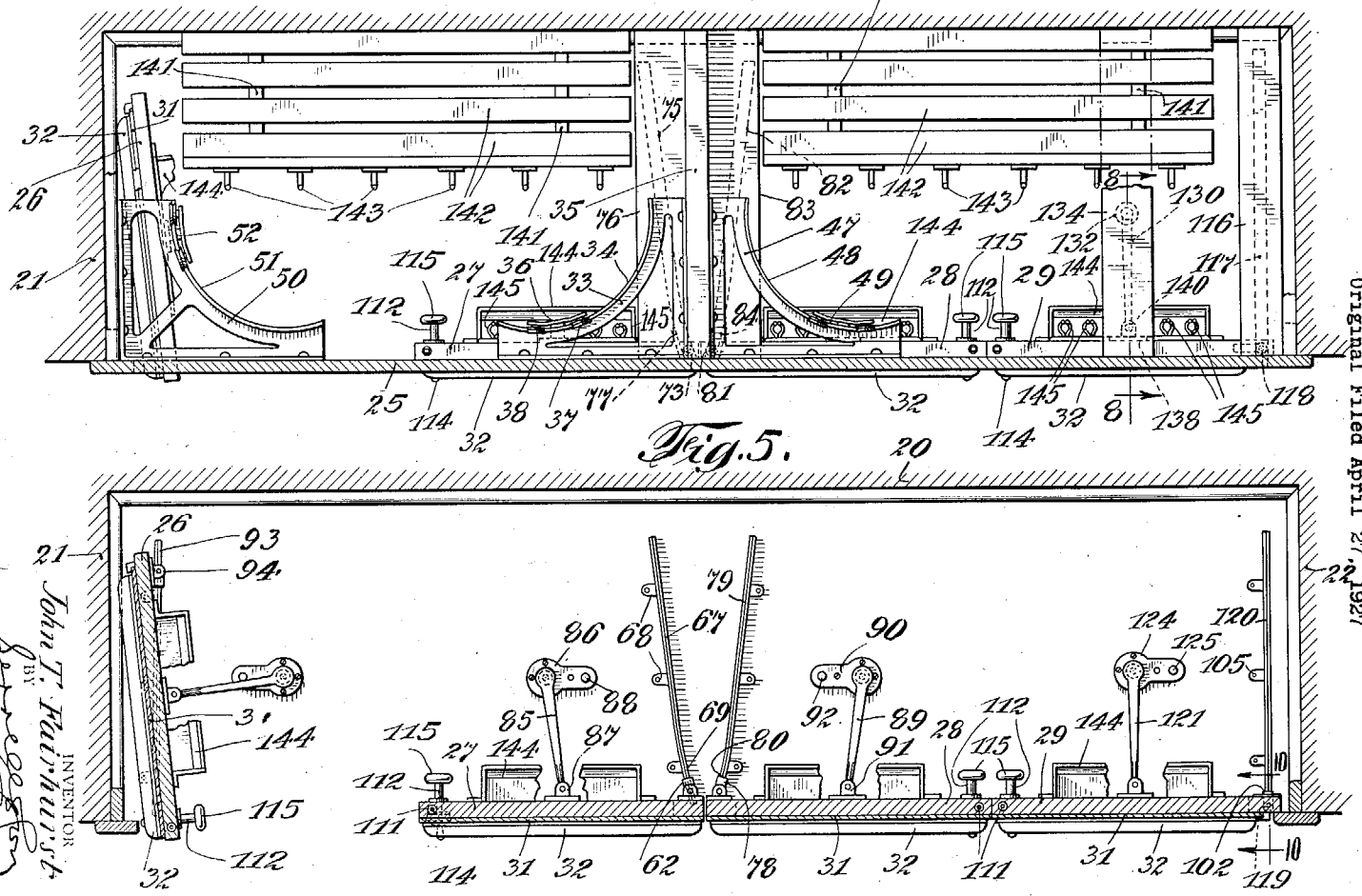
INVENTOR
John T. Fairhurst
BY
Sennell & Son
ATTORNEYS INVENTOR
John T. Fairhurst
BY
Sewell & Son
ATTORNEYS July 8, 1930.

J. T. FAIRHURST

WARDROBE

Re. 17,721

Original Filed April 27, 1927

4 Sheets-Sheet 4

INVENTOR

John T. Fairhurst

BY his ATTORNEYS

Reissued July 8, 1930 Re. 17,721

UNITED STATES PATENT OFFICE

JOHN T. FAIRHURST, OF FOREST HILLS, NEW YORK, ASSIGNOR TO J. G. WILSON CORPORATION, OF NEW YORK, N. Y., A CORPORATION OF VIRGINIA

WARDROBE

Original No. 1,658,593, dated February 7, 1928, Serial No. 186,870, filed April 27, 1927. Application for reissue filed June 22, 1929. Serial No. 373,032.

This invention relates to a wardrobe and more particularly to that type of wardrobe in which the doors employed for closing the same are so mounted as to slide and partially revolve in order to economize space both inside and outside of the wardrobe. Heretofore, wardrobes, cabinets and similar structures have been provided with doors so mounted as to slide and swing, that is to slide and to also partially revolve. In this type of wardrobe the doors are usually constructed to normally close the front or face portion of the wardrobe and are usually two in number, that is there is a pair of doors. In some instances wardrobes are made in sections separated from each other by partitions, and each section provided with a pair of doors, each pair of doors being separated by the partition which separates the sections of the wardrobe. These doors as usually constructed are mounted to slide and swing in such a manner that the adjacent edges of the doors when closed assume a substantially central position relatively to the front of the wardrobe, and in opening the doors that is causing the same to slide and swing the adjacent edges thereof move outwardly. When mounted to swing in this manner there is no material interference between the adjacent edges of the doors as the same are moved apart in opening either one or both doors to gain access to the wardrobe. However, in instances where it is desirable to use a plurality or number of doors greater than two and to arrange them as a continuous front when closed, some of the doors must be mounted to turn in the other direction, that is to cause their normally adjacent edges to move inwardly, and in such cases there may be an obvious interference between the adjacent edges of the doors. This is decidedly disadvantageous in many places, where for example in the use in class rooms, lecture halls and like places, the faces of the doors may be fitted with slabs of slate for use as black boards, in which instance it will be manifest any interference between the edges of adjacent doors in moving inwardly would tend to crack and break or otherwise injure the edges of the slabs of slate so as to mar their appearance and break the continuity of the blackboard which is otherwise continuous when the doors are closed. Of course, it will be understood that in this particular use of the wardrobe there are necessarily employed sets of doors in excess of two, particularly when the wardrobe is made to extend the entire width or length of a class room or lecture hall.

The invention in the present case relates to a wardrobe or like structure adapted for use in class rooms and lecture halls and to extend the entire length or width or a material part thereof across one side of the room and in which the front members of the wardrobe are sliding and swinging doors each provided with a slab of slate or other similar material forming a blackboard. In structures of this kind the doors are necessarily of a greater number than two, and the adjacent edges of predetermined doors must swing inwardly instead of outwardly, and one of the objects of the invention is to provide devices associated with the inwardly moving edges of adjacent doors for parting the same or causing them to separate or shift sufficiently upon their initial inward and final outward movement to prevent them from contacting with each other and consequently obviating the liability of marring, breaking or otherwise injuring the inwardly swinging edges of adjacent doors. The apparatus by which this is accomplished as well as the apparatus employed in carrying out other objects of the invention will be hereinafter more particularly described.

In the drawing Figure 1 is a front elevation and partial cross section illustrating a wardrobe made in accordance with this invention.

Fig. 4 is a sectional plan on an enlarged scale on line 4—4, Fig. 1.

Fig. 5 is also a sectional plan on an enlarged scale on line 5—5, Fig. 1.

Figure 1:
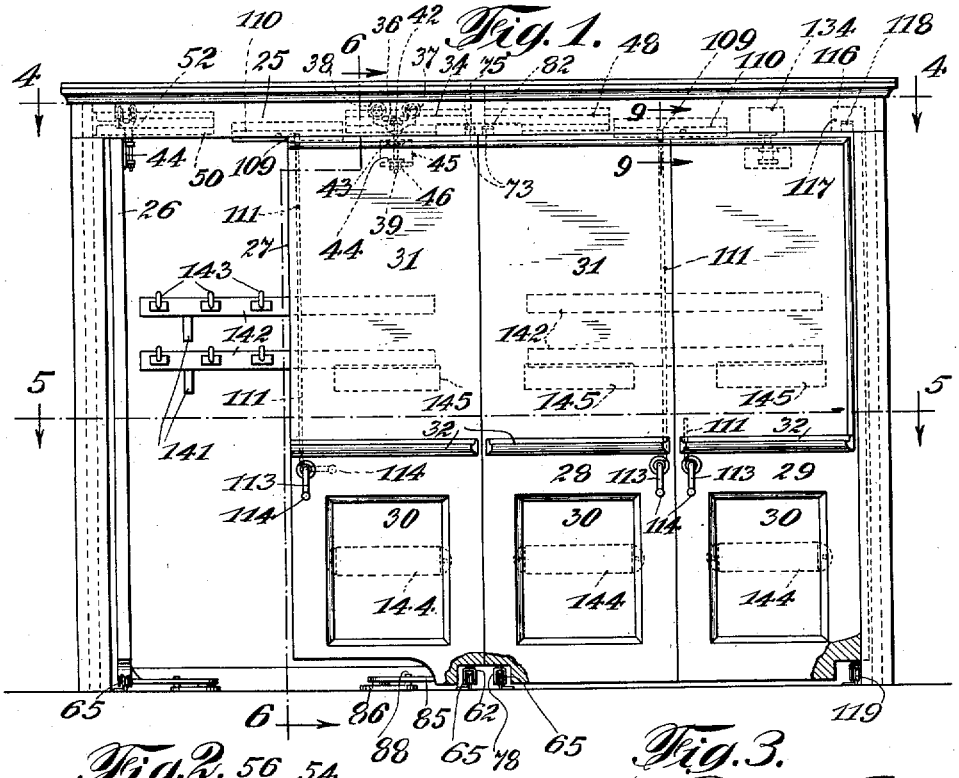

As illustrated in the drawing, the wardrobe in which the present invention is incorporated comprises a rear wall 20, end walls 21 and 22, a base or floor 23, a top wall 24 and a stringer or upper board 25 extending across the front which is otherwise open and fitted with doors 26, 27, 28 and 29 which fill the open front of the wardrobe and when shut enclose the same. Obviously, the wardrobe may be constructed as a unit or built in as a part of a building or otherwise. It will be equally obvious that the doors may be made in any suitable manner. As illustrated, however, each door in its lower portion is fitted with a panel 30 and in its upper face portion with a slab of slate 31. Exteriorly each door may also be provided with a rack 32 for holding crayon, chalk or other materials for marking on the slate, as well as erasers for obliterating the marks. The doors are so constructed and arranged as to form a continuous front for the wardrobe whereby as will be understood when the doors are closed the adjacent edges thereof abut against each other making the blackboard a substantially continuous structure so as to present a uniform and neat appearance and to be usable for school, lecture and other purposes.

The doors may be mounted to slide and to swing or rotate in a manner which is old in the art so as to be moved from their normally closed positions in which they enclose the wardrobe to open positions in which they lie within the wardrobe in substantially their entireties. This of course, will depend upon the width of the doors and the depth of the wardrobe, but in any event, the doors when open do not protrude appreciably beyond the front of the wardrobe. To this end for example, the door 27 is mounted to move on a hanger which runs on a curved track. As illustrated in the drawing, there is a bracket 33 having an arcuate track 34 which is substantially a quadrant, this bracket being suitably connected in the upper portion of the wardrobe by being secured to a cross bar 35 and the adjacent portion of the stringer piece 25 or otherwise. There is a hanger 36 fitted with rollers 37 and 38 which are adapted to run on the track 34. The hanger 36 has a spindle 39 swiveled in lugs 40 and 41, the upper end of the spindle being provided with a head 42 which determines its position in one direction relatively to the lugs 40 and 41. The spindle 39 also is swiveled in lugs 43 and 44 on a plate 45 which is suitably secured by means of screws or otherwise to the inner face of the door 27 adjacent the upper end thereof and in a substantially centrally disposed position. The spindle 39 beneath the lug 44 is fitted with nuts 46 which may be adjusted to determine the position of the door relatively to the hanger and the track upon which it moves.

The door 28 may be mounted to slide and swing or rotate in a similar manner by means of a bracket 47 including a curved track 48 and a hanger 49 similar in all respects to those hereinbefore described. In like manner, the door 26 is mounted to slide and turn or rotate by means of a bracket 50 having a curved track 51 and a hanger 52.

Figure 2:
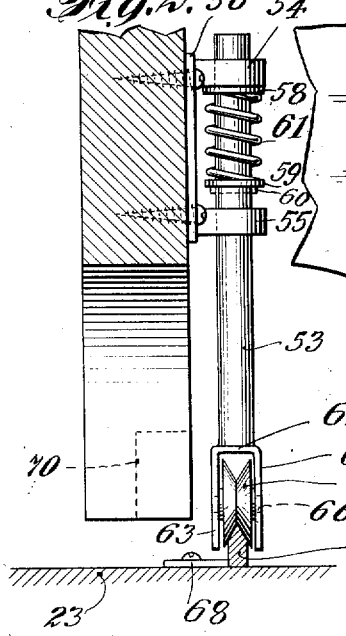
Fig. 2 is an enlarged sectional elevation illustrating a form of guide member employed at the bottom of the inwardly moving edge of a door.
Figure 3:
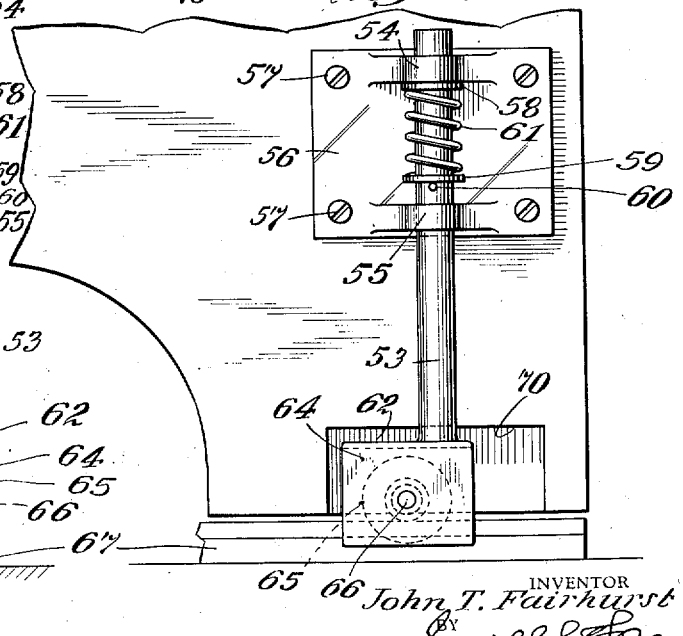
Fig. 3 is a front elevation of the structure shown in Fig. 2.
Figure 6:
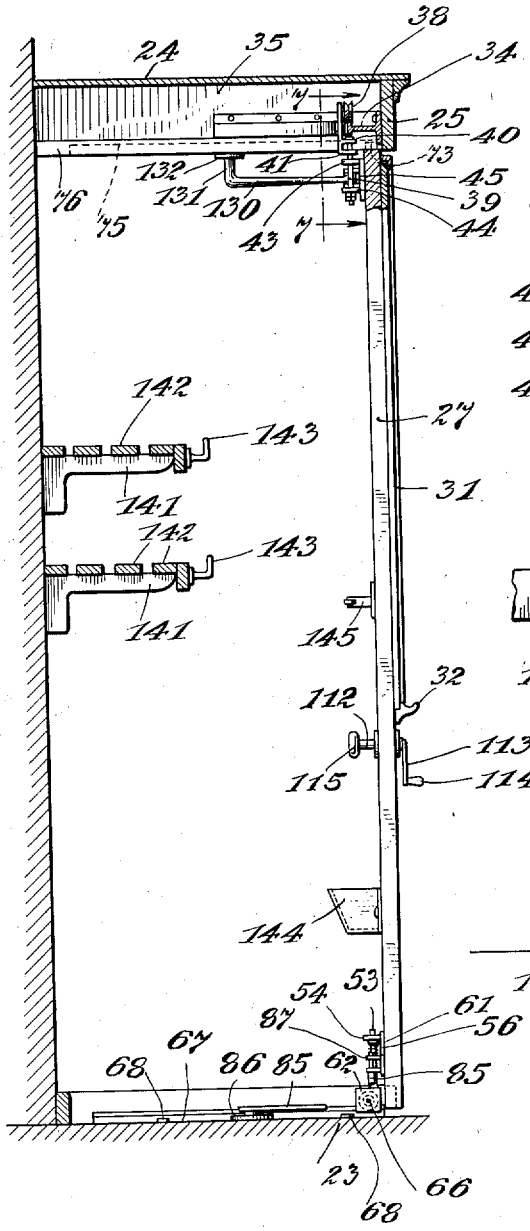
Fig. 6 is a sectional elevation on an enlarged scale on line 6—6, Fig. 1.
Figure 7:
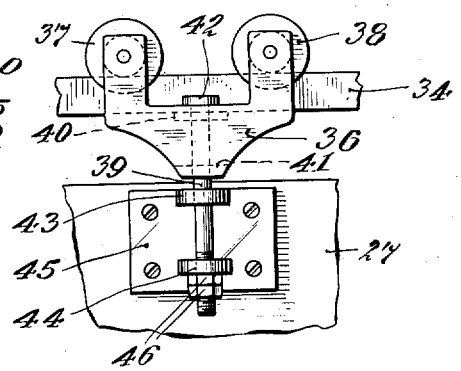
Fig. 7 is a partial elevation on an enlarged scale showing a hanger for one of the doors, taken on line 7—7, Fig. 6.
Figure 8:
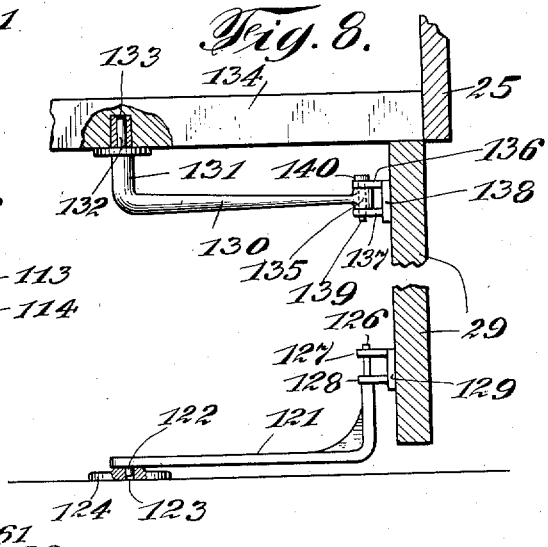
Fig. 8 is a sectional elevation on an enlarged scale on line 8—8, Fig. 4.
Figure 9:
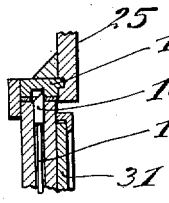
Fig. 9 is a section on line 9—9, Fig. 1.

In carrying out the invention in the present case the inwardly moving vertical edge of each door is provided both at the bottom and at the top thereof with devices for guiding or directing its movement in such a manner that in the initial movement thereof the edge of either door is shifted from the edge of the adjacent door or if both doors are moved simultaneously these inwardly moving vertical edges are shifted so as to separate upon the initial movement of the doors in order as hereinbefore stated to prevent the edges of the doors from coming in contact and thus becoming damaged. By reference to the drawing it will be seen that the adjacent edges of the doors 27 and 28 move inwardly upon being opened and in order to effect the shifting of the doors to a position in which these inwardly moving edges do not contact with each other, the doors as hereinbefore stated at these inner edges are provided also on the bottom and at the top with devices for effecting this shifting movement. At the bottom of the door 27 and in a position spaced slightly from the edge thereof which is adjacent the edge of the door 27 there is suitably mounted a rod 53. As illustrated, particular reference being made to Figs. 2 and 3, this rod is journaled to swivel in lugs 54 and 55 extending from a plate 56 which by means of screws 57 or otherwise is secured to the lower inner face of the door adjacent this inwardly moving edge thereof. Adjacent the lug 54 the rod 53 is fitted with a collar 58 and spaced therefrom and relatively adjacent the lug 55 the rod is also provided with a collar 59 which is normally maintained against a pin 60 extending through and projecting from the rod by means of a spring 61 which surrounds the rod and extends between the collars 58 and 59, whereby as will be understood the door is supported to a certain extent by this rod and the devices immediately to be described. At the lower end of the rod the same is provided with a yoke head 62 the arms of which are indicated at 63 and 64. Mounted in the yoke head 62 is a roller 65. This roller is provided with a peripheral V-shaped notch as clearly illustrated in the drawing, and is mounted on a shaft 66 which is connected in the arms or sides of the yoke head. The roller 65 is adapted to run on a track 67, the upper or contact surface of which is wedge shape as is also clearly indicated in the drawing, whereby as will be understood the roller is particularly adapted to engage the track and cannot easily jump or become disengaged therefrom. In suitable positions the track 67 may be provided with flanges 68 so that by screws or bolts or other suitable means the track is secured to the base or floor of the wardrobe. Also as clearly indicated in the drawing, the track adjacent its outer end is provided with a more or less sharp bend or curve 69. This bend or curve in the track directs the travel of the roller and through the same and the rod with its connections to the door causes the door to shift crosswise thereof a predetermined distance upon its initial movement in moving the same to an open position. In order to effect this purpose, the roller 65 is mounted in a position in the yoke head offset from the axis of the rod as is clearly indicated in Fig. 3, and in order to provide for the shifting of the door from one position to the other, that is from its open to its closed position, and vice versa, the lower inner surface of the door is recessed as indicated at 70 to accommodate the various positions of the yoke head.

In its upper edge the door 27 is provided with a plate 71 which is preferably set in a recess provided therefor and which is secured in position by means of screws 72 or otherwise. On the forward end of the plate 71 there is a roller 73. This is mounted on a screw shaft 74 and is adapted to travel in a groove 75 provided for this purpose in a guide rail 76 which extends crosswise of the wardrobe in the upper portion thereof. In the groove 75 there is a relatively sharp bend or curve 77 which corresponds in position and degree with the curve 69 in the track 67, it being understood that the groove 75 is placed immediately above the track 67 and corresponds therewith in outline and extent. This roller operating in the groove performs the same function at the top of the door as the rod and the associated parts do at the bottom of the door, in other words, upon the initial movement of the door due to the curve in the groove and also in the track the edge of the door is shifted, that is the door moved transversely so as not to come in contact with the adjoining edge of the adjacent door. In the lower guiding device as hereinbefore described, being attached to the lower inner surface of the door exteriorly thereof, makes it necessary to cause the track 67 and the groove 75 to extend at an angle or inclination to the wardrobe transversely thereof, these positions being indicated in Figs. 4 and 5 of the drawing. The reason for this is that it is desirable to have the door when open assume a position as near as possible to right angles to that which it assumes when in a closed position. It is quite possible as hereinafter described to mount the guiding devices at the lower end of the door beneath the same so that the tracks and grooves may run in a truly transverse direction from the curved portions thereof to their inner ends.

Figure 13:
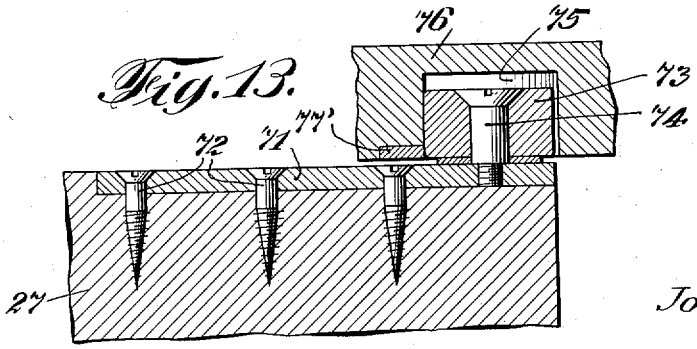
Fig. 13 is a sectional elevation on line 13—13, Fig. 12.

The door 28 at the edge thereof adjacent the edge of the door 27 is provided with a head 78 similar in all respects to the head 62 as hereinbefore described and fitted in the same manner with a roller adapted to run on a track 79 in which there is a curve or bend 80 so that this track corresponds with the track 67 with the exception that the bent portions thereof are in reverse positions. Similarly the upper edge of the door 28 adjacent the edge adjoining the door 27 is fitted with a roller 81 corresponding to the roller 73 and running in a groove 82 in a guide rail 83, the groove 82 corresponding to the groove 75 and the guide rail 83 being integral with or the complement of the guide rail 76, it being understood that the groove 82 is provided with a bend or curve 84 similar to and corresponding in position with the curve in the groove 75 so that the action of shifting the door transversely is accomplished in the same manner upon the initial movement of the door 28 as that of the door 27. It therefore follows that when either of these doors is open and closed alone or when these doors are opened and closed simultaneously the same are shifted laterally or transversely of themselves in order to prevent their inwardly moving adjacent edges from coming into contact with and damaging each other. Furthermore, the fitting at the upper adjacent edges of these doors is such that the rollers 73 and 81 wedge when the doors are closed so as to assist in maintaining the doors in their closed positions, for example as indicated in Fig. 13, the guide rail 76 may be provided with an insert 77′ made of metal or other material to prevent undue wear thereof and against which and the adjacent face defining the groove the roller 73 is adapted to wedge when the door is closed.

Also as is customary in some structures of like nature, the doors are provided with members for guiding or directing the movements thereof when sliding and rotating or swinging from an open to a closed position, and vice versa. For example the door 27 may be provided with a positioning lever 85 which at one end is journaled in a plate 86 secured to the floor or base of the wardrobe and at its other end pivotally connected to a bracket 87 which is secured to the lower inner face of the door in a centrally disposed position. The plate 86 is provided with a boss or pin 88 which acts as a stop for the lever 85 which when the door is opened contacts with this member. This is illustrated in the corresponding parts of the door 26 as shown in Fig. 5 of the drawing. In a similar manner the door 28 is provided with a positioning lever 89 swiveled at one end in a plate 90 secured to the floor or base of the wardrobe. At its other end this lever 89 is pivotally connected to a bracket 91 which is fixed to the lower inner face of the door in a substantially central position. The plate 90, like the plate 86, is also provided with a stop, the stop on the plate 90 being designated at 92. The door 26 as illustrated, is provided with devices similar to those hereinbefore described for guiding the movements thereof in opening and closing the same. For example there is a track 93 similar to the tracks 67 and 79 and the door is provided with a yoke head 94 and devices associated therewith similar to those hereinbefore described in detail as connected to the door 27.

Figure 10:
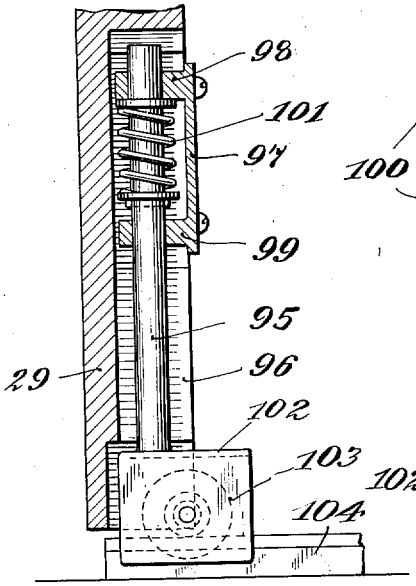
Fig. 10 is an enlarged section taken on line 10—10 Fig. 5.
Figure 11:
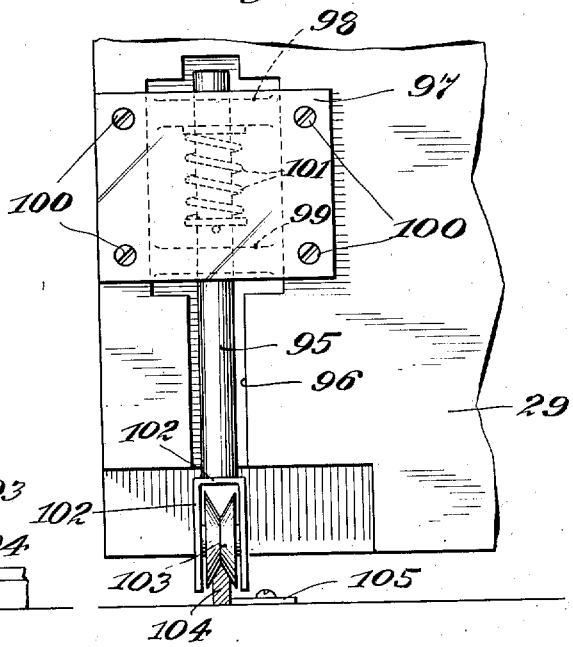
Fig. 11 is a front elevation of the parts shown in Fig. 10.
Figure 12:
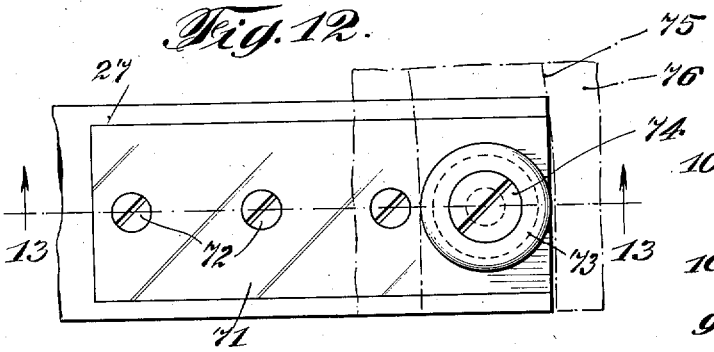
Fig. 12 is a partial plan on an enlarged scale of the top of one of the doors.
Figure 14:
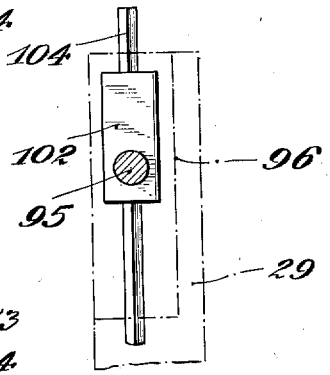
Fig. 14 is a plan showing another form of guide as employed at the lower end of one of the doors.

As hereinbefore stated, the devices for directing the initial movement of the adjacent edges of the doors may be mounted within instead of exteriorly of the doors. As shown in Figs. 10 and 11, a rod 95 similar to the rod 93 is mounted in a recess 96 provided therefor in the lower portion of a door. This rod 95 is connected to a plate 97 by being journaled to swivel in lugs 98 and 99 extending from the plate into the recess 96, the plate 97 being secured to the door by means of screws 100 or otherwise. This rod 95 is mounted on a spring 101 which functions in a manner similar to the spring 61 and at its lower end the rod 95 is provided with a yoke head 102 in which there is a roller 103 having a peripheral V shaped groove adapted to run on a wedge shape track 104 which is secured in place by means of flanges 105 fixed to the floor or base or otherwise. This track 104 is curved adjacent its outer end and then may extend in a directly transverse direction to its inner end. As illustrated in Fig. 14, the head 102 at the lower end of the rod 95 assumes a position entirely within the confines of the door.

In order to assist in maintaining each door in the position in which it closes the wardrobe or cabinet, I may employ a latch 109 extending appreciably above the upper edge of the door and adapted to engage in a recess in a plate 110 suitably secured in position above the door. The latch 109 of each door is connected by a rod 111 with a pintle 112 connected with which exteriorly of the door is a lever 113 and a handle 114, while connected to the pintle interiorly of the door is a knob 115. The latch, its rod and the handle and knob may be yieldingly maintained in a normal position by any suitable means, whereby as will be apparent the latch may be withdrawn exteriorly of the door by operating the lever 113 and its handle 114 and also interiorly of the door should this be necessary by operating the knob 115.

As illustrated in the drawing and particularly in Figs. 1, 4, 5 and 8, the door 29 at one end of the cabinet is mounted to slide and rotate without the use of the bracket having the arcuate track and the hanger associated with the same and the door as hereinbefore described in conjunction with the manner in which the other doors are mounted. In this instance, in the upper portion of the cabinet there is a cross bar 116 having a groove 117 therein and secured in the upper edge of the door there is a roller 118 mounted in a manner similar to that hereinbefore described in connection with the roller 73 and adapted to run in the groove 117 to direct the sliding and rotating movement of the door at the top thereof. At the bottom of the door there is a roller 119 adapted to run on a track 120. The roller 119 is preferably mounted in the same manner as that hereinbefore described in connection with the roller 103, although it will be understood that this roller may be mounted in any suitable manner. In this instance, as the adjacent vertical edge of the door is at the end of the wardrobe or cabinet the groove 117 and the track 120 may be straight throughout their entireties as there is no necessity for shifting the door in order to prevent the vertical edge thereof from contacting with any adjacent surface. The roller 119 in this construction not only forms the main support for the door, but also directs the inward movement of the adjacent vertical edge of the same when moving inwardly as well as outwardly. In this structure also, at the bottom of the door there is a support and guide lever 121. As illustrated, one end of this lever is provided with a pin 122 adapted to be received in a socket 123 in a plate 124 fixed in the floor or base of the wardrobe. The plate 124 in a manner similar to the corresponding plates hereinbefore described is preferably fitted with a stop pin 125 to determine the swinging movement of the lever 121 in its inward direction. The other or outer end of the lever 121 is turned upwardly and at its extremity is of reduced cross section forming a pin 126 adapted to be pivotally connected to lugs 127 and 128 extending from a bracket 129, which latter is suitably connected in a centrally disposed position adjacent the inner surface of the door. This lever 121 as will be apparent not only guides the door in the sliding and rotating movement thereof in being opened and closed, but also assists in supporting the same.

To guide or direct the sliding and rotating movement of the door at the upper end thereof there is a lever 130. The outer end or arm 131 thereof is made to terminate in a pin 132 which is adapted to be received in a socket 133 provided therefor in a cross bar 134 suitably fixed in the upper portion of the wardrobe. The opposite or outer end of this lever 130 terminates in a head 135 adapted to fit within lugs 136, 137 extending from a bracket 138 and to be pivotally connected thereto by a pin 139 extending through the lugs and the head and the position of which is determined by the enlarged end or head 140 of the pin in contact with the outer surface of the lug 136. In this structure as will now be readily apparent, the door is not only adequately mounted to slide and rotate to and from its open and closed positions, but also is readily dismounted for repairs or adjustment or other purposes.

Also as illustrated, the wardrobe may be fitted interiorly with a series of brackets 141 upon which are mounted rails or bracket bars 142 so as to form shelves within the wardrobe and each shelf at the outer edge thereof may be provided with a plurality of hooks or hangers 143.

Also as illustrated in the drawing, each door on the inner side thereof may be provided with a tray 144 adapted to receive the lower end of an umbrella for example which may be maintained in position by having the upper end engaged by a clamp or rack 145, each tray being adapted to receive water which may drip or drain from an umbrella and to coact with the corresponding rack to maintain an umbrella in position.

I claim as my invention:

1. In a wardrobe, doors arranged substantially to meet when closed and mounted to slide horizontally and to swing independently between closed positions in substantial alignment and open positions within the wardrobe, and means for controlling the movement of the doors to cause the adjacent margins to swing inwardly during the movement of the doors from closed to open positions comprising tracks diverging in a direction from the front to the rear of the wardrobe for guiding respectively the adjacent margins of the doors.

2. In a wardrobe disconnected doors mounted for horizontal sliding and swinging movement between closed positions in which their adjacent margins substantially meet and open positions in which said margins are located at the rear of the wardrobe, means for guiding the doors comprising tracks diverging in a direction from the front to the rear of the wardrobe and arranged to guide the adjacent margins of the doors for causing the doors to recede to positions substantially perpendicular to their closed positions and for preventing their adjacent edges from contact during their opening and closing movements.

3. In a wardrobe, doors mounted for horizontal sliding and swinging movement between closed positions in which they form a continuous front for the wardrobe and open positions in which they subdivide the wardrobe into separate compartments and means comprising diverging tracks for guiding the doors without striking into aligned positions when closed and into positions substantially parallel when open.

4. In a wardrobe, co-operating doors each mounted for independent horizontal sliding and swinging movement to carry the adjacent margins of the doors inwardly during the opening of the doors and to bring the adjacent edges substantially into meeting relation when the doors are closed to form a continuous front for the wardrobe, and means comprising flaring tracks for supporting the doors and controlling the movement thereof.

5. In a wardrobe, co-operating doors mounted for independent horizontal sliding and swinging movement between closed positions in substantial alignment and open positions in which they subdivide the wardrobe into smaller wardrobe sections, means comprising tracks for supporting and guiding the doors, said tracks being arranged in divergent relation to cause the adjacent margins of the doors to move to closed and open positions without striking.

6. A wardrobe construction comprising a plurality of doors arranged when closed to extend along the front of the wardrobe in substantially the same plane and mounted for sliding and swinging movement in directions to carry the adjacent margins of certain of said doors inwardly of the wardrobe, tracks at the ends of the wardrobe extending substantially at right angles to said plane for guiding the outer margins of the doors adjacent the ends of the wardrobe, and diverging tracks for guiding the adjacent margins of intermediate doors.

7. A wardrobe construction comprising a plurality of doors mounted for sliding and swinging movement and arranged when closed to extend along the front of the wardrobe in substantially the same plane and when open to subdivide the wardrobe into compartments, tracks at the ends of the wardrobe for guiding the outer margins of the doors adjacent the ends of the wardrobe and divergent tracks for guiding the adjacent margins of intermediate doors.

8. A wardrobe construction comprising a plurality of doors arranged when closed to extend along the front of the wardrobe in substantially the same plane and mounted for sliding and swinging movement to carry the adjacent margins of certain of said doors inwardly of the wardrobe, tracks for guiding the outer margins of the doors adjacent the ends of the wardrobe, and divergent tracks respectively for guiding one margin of each of the intermediate doors.

9. A wardrobe construction comprising cooperating doors mounted for sliding and swinging movement from closed positions in substantially the same plane at the front of the wardrobe to open positions within the wardrobe, and devices for guiding the doors to carry the adjacent margins of said doors inwardly and the remote margins outwardly during the opening movements of the doors, comprising means for imparting to each of said doors movements to carry their adjacent margins away from each other during their initial opening movements.

10. A wardrobe construction comprising two or more doors mounted to move to closed positions in substantial alignment and to adjacent open positions within the wardrobe subdividing the wardrobe space, with their lateral faces in face to face relation, and diverging guides extending from the front to the rear of the wardrobe for guiding the doors.

11. In a wardrobe construction having blackboard carrying doors arranged to close into substantial alignment, providing a substantially smooth blackboard surface extending from one door to another, and means comprising diverging guides for guiding the doors to cause the doors to move to open positions in which they form partitions within the wardrobe dividing the wardrobe into smaller sections.

12. In a wardrobe construction, independently operating doors mounted for sliding and swinging movements between open and closed positions and in directions to carry the adjacent margins of the doors inwardly during their opening movements, an overhead track for each of said doors, devices engaging said track for suspending and wholly supporting the corresponding door in a substantially vertical position, and devices respectively for guiding the doors into aligned closed positions along the front of the wardrobe and into open positions within the wardrobe in which they subdivide the wardrobe space comprising spaced floor tracks extending within the wardrobe from the front to the rear thereof, and guides respectively attached to the adjacent margins of adjacent doors at the bottoms thereof and engaging the respective tracks for guiding independently said doors.

JOHN T. FAIRHURST.